Aug. 27, 1957 T. E. PYNOR 2,804,349
PULVERIZED MATERIAL FEEDER APPARATUS
Filed Jan. 26, 1956 2 Sheets-Sheet 1
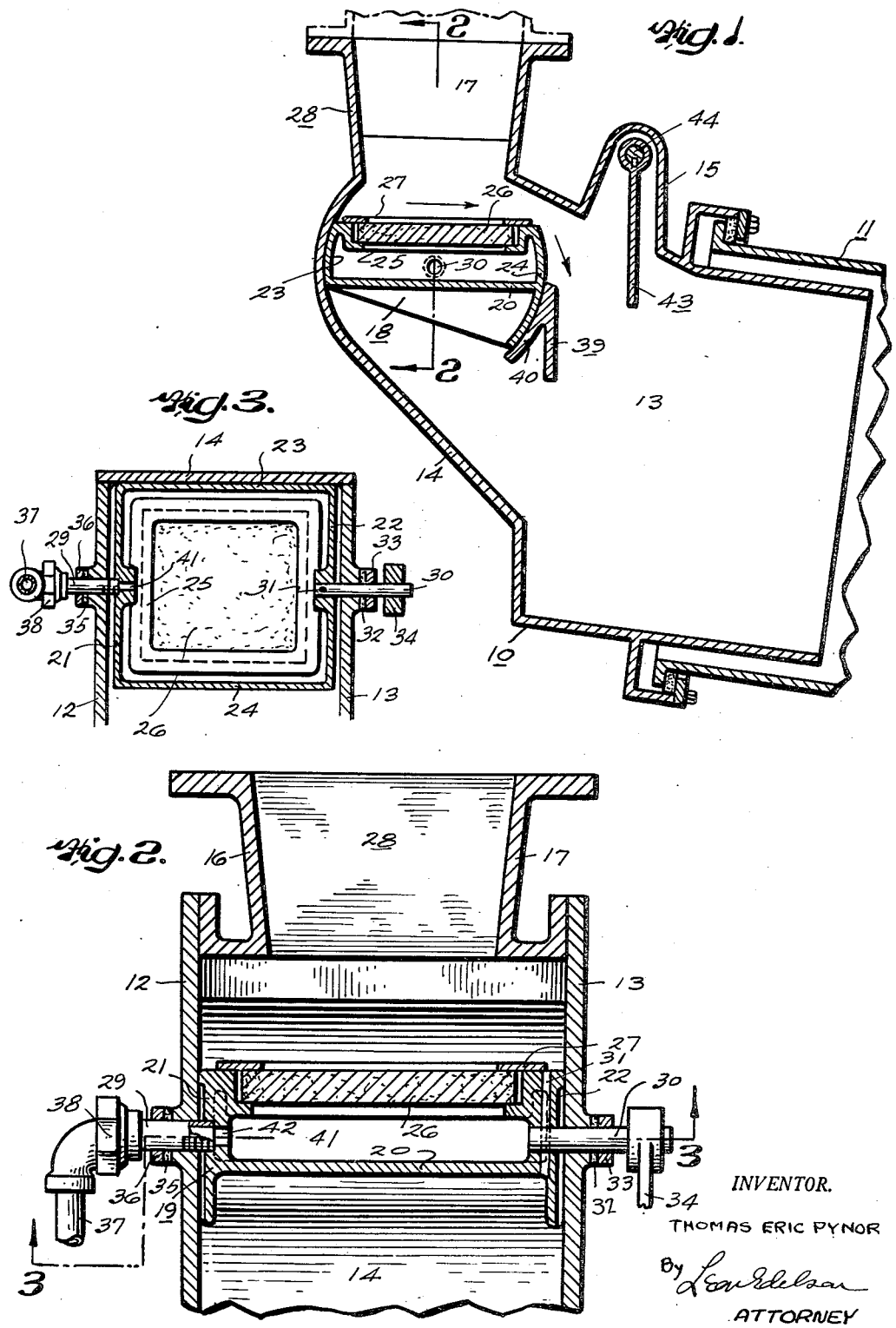
INVENTOR.
THOMAS ERIC PYNOR
By Leo Edelson
ATTORNEY

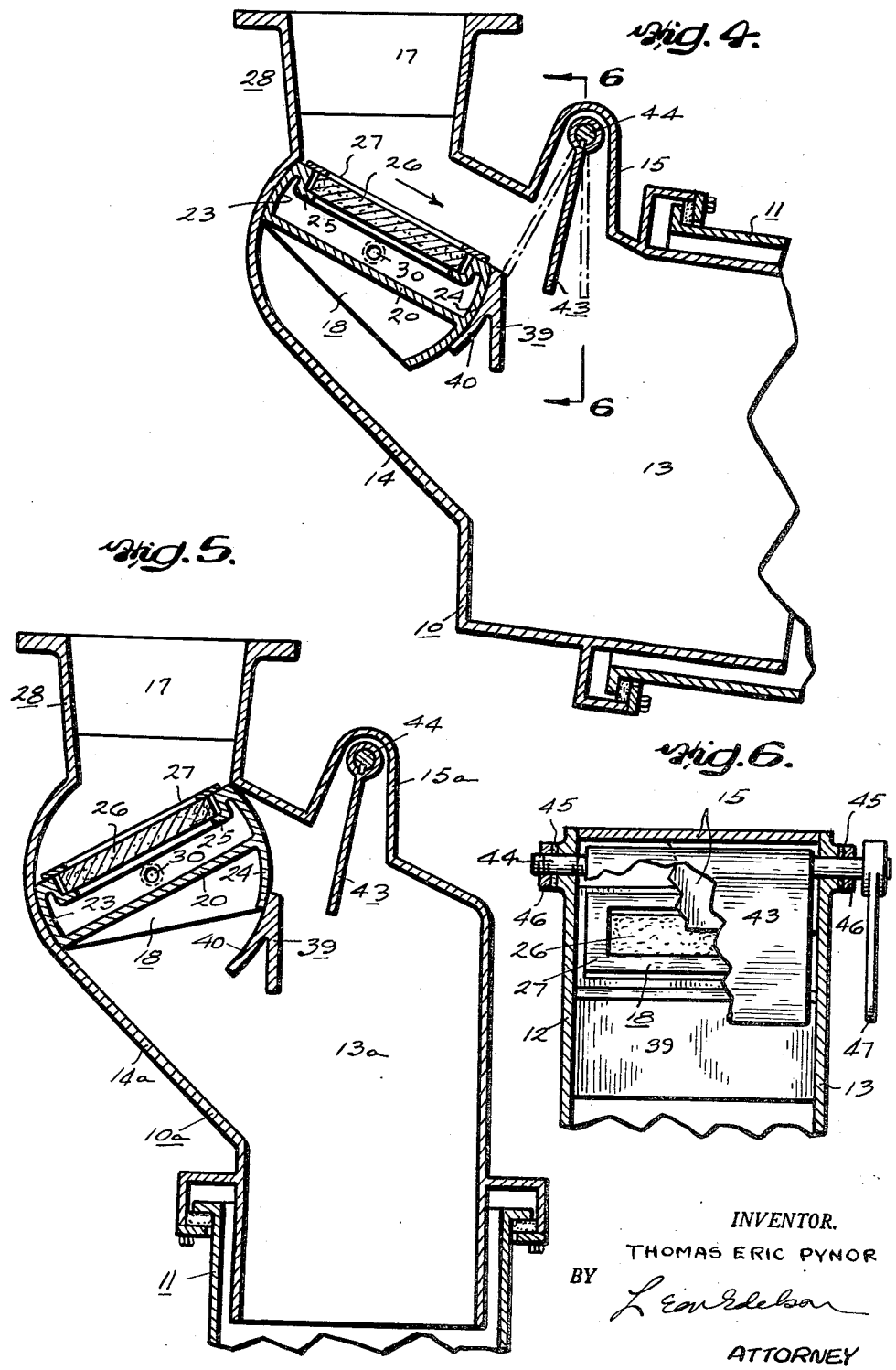

United States Patent Office 2,804,349
Patented Aug. 27, 1957

2,804,349

PULVERIZED MATERIAL FEEDER APPARATUS

Thomas Eric Pynor, Port Kennedy, Pa., assignor to Beaumont Birch Company, Philadelphia, Pa., a corporation of Pennsylvania Application January 26, 1956, Serial No. 561,551

4 Claims. (Cl. 302—29)

This invention relates generally to apparatus for controlling and regulating gravity flow of finely divided or pulverulent dry materials through a conduit and more particularly to a feeder of a type which is effective to obstruct the flow of such material in its natural condition and which normally is ineffective to obstruct the flow of such material when the same has been fluidified, as by passing gas through a porous medium and introducing the same into the body of material.

A principal object of the present invention is to provide a feeder of the type aforesaid which is characterized by means for selectively varying the inclination of the surface of the porous medium, whereby the flow of the fluidified material is controlled and regulated.

Another object of the present invention is to provide a feeder of the type aforesaid which is operable for terminating the flow of material, independently of the flow of gas through said porous medium and the introduction thereof into the body of material.

Still another object of the present invention is to provide for such a feeder auxiliary valve means operable independently of the feeder in any adjusted material passing, open position for terminating the flow of material.

Other objects and advantages of the present invention will appear more fully hereinafter, it being understood that the present invention consists in the combination, construction, location and relative arrangement of parts, as will be more fully described hereinafter, as is shown in the accompanying drawings and will be pointed out in the appended claims.

In the accompanying drawings:

Figure 1 is a vertical section through apparatus embodying the present invention, the feeder being shown in horizontal, partially open position;

Figure 2 is an enlarged vertical section on line 2—2 of Figure 1;

Figure 3 is a reduced horizontal section on line 3—3 of Figure 2;

Figure 4 is similar to Figure 1, but shows the feeder inclined to material passing, fully opened position and the auxiliary valve in an intermediate position;

Figure 5 is similar to Figures 1 and 4, but shows the feeder inclined to fully closed position and the conduit somewhat modified at the outlet end; and Figure 6 is a vertical section on the line 6—6 of Figure 4.

To illustrate a typical organization embodying my invention the drawings show a conduit section 10 that is generally rectangular in transverse cross section and which is provided with an inlet end and a lower outlet end, the latter communicating with a conduit section 11. The conduit section 10 has upright opposite side walls 12—13 which are respectively disposed in vertically extending parallel planes. On one side of the conduit, these side walls 12—13 are connected by a side wall 14, and on the opposite side of the conduit, they are connected by a side wall 15. These side walls 14—15 extend upwardly above the side walls 12—13, and on one side of the conduit they are connected to one another and the side wall 12 by a side wall area 16, while on the opposite side of the conduit they are connected to one another and the side wall 13 by a side wall area 17.

Within the conduit section 10, a substantial distance below the inlet opening, is a feeder unit designated generally by the numeral 18. Referring particularly to Figures 1, 2, and 3, this feeder unit includes a horizontally extending rectangular frame 19 that has a bottom wall 20, upright opposite side walls 21—22 which are disposed in vertically extending parallel planes and upright opposite side walls 23—24. The frame 19 is journalled in the side walls 12—13 of the conduit section 10 for pivotal movement about a horizontal axis, by means to be described hereinafter, and the side walls 23—24 of the frame 19 extend along arcuate portions of a circle that is centered at the pivotal axis of the frame 19. All of the side walls of the frame 19 rise above the bottom wall 20, while the side walls 21, 22 and 24 additionally extend below the bottom wall 20, as shown. The rim portion of the frame 19 is provided with a continuous internal flange 25 which is Z-shaped in transverse cross section to provide a deep recess for receiving a rectangular member made of filter stone, porous brick or procelain, or the like, designated 26. For securing this porous medium 26 against displacement, the frame 19 is suitably fitted with a plate 27 which extends about the rim of the frame and overlies the marginal portions of the member 26.

At the inlet end of the conduit section 10, the conduit is restricted in transverse cross section to thereby form a neck 28 the lower end of which generally corresponds in size to the uncovered exposed upper surface area of the porous medium 26, over which surface area the lower end of the neck 28 is centered. The side walls 12—13 of the conduit section 10 extend downwardly from the neck 28 respectively in close adjacent relation to the opposite side walls 21—22 of the frame 19, the side wall 14 of the conduit section 10 extends arcuately downwardly from the neck 28 in close adjacent relation to the side wall 23 of the frame 19 as shown, and the side wall 15 of the conduit 10 extends downwardly and outwardly from the neck 28 over the associated marginal portion of the frame 19 as shown, in spaced relation thereto.

To mount the feeder unit for pivotal movement about a horizontal axis, the frame 19 is fitted with coaxially related pivot elements 29—30 that project outwardly in opposite directions respectively from the opposite side walls 21—22 of the frame 19. The pivot element 30 is fixed in the side wall 22 by a pin 31 and projects through the side wall 13 of the conduit section 10, being suitably fitted with a washer 32, a collar 33 and an operating lever 34. The pivot 29 is a tubular element threaded into the side wall 21 of the frame 19 and projected through the side wall 12 of the conduit section 10, being suitably fitted with a washer 35 and a collar 36. A pipe line 37 is connected to the tubular element 29 by a flexible coupling 38 for a purpose to be described.

Extending horizontally across the conduit section 10 between the opposite side walls 12—13 is a rigid upright member 39 that is provided with an arcuate apron 40 which is fitted against the lower longitudinally extending portion of the side wall 24 of the frame 19. By actuation of the operating lever 34, the feeder unit 18 may be tilted from the horizontal, partially open position shown in Figure 1 to any other position intermediate the material passing, fully opened position shown in Figure 4 and the fully closed position shown in Figure 5, any suitable means may be employed for actuating the lever 34 and for securing the feeder unit 18 in any adjusted position.

The feeder unit 19 is arranged and formed to provide a plenum chamber 41 underlying the porous medium 26, which chamber is placed in communication with the pipe line 37 through an opening 42 in the side wall 21 of the frame 19.

On the downstream side of the conduit section 10 there is a shut off valve in the form of a plate 43 that depends from a pivot shaft 44 which extends horizontally across the conduit section 10. The opposite end portions of the shaft 44 are journalled respectively in the opposite side walls 12—13 of the conduit section 10, and the shaft 44 is suitably fitted with washers 45—45, collars 46—46 and an operating lever 47. By actuation of the operating lever 47, the flow of material through the conduit section 10 can be shut off while the feeder unit 18 is in fully, or one of its partially opened positions.

In the operation of the apparatus embodying the present invention, air or any other gas under suitable pressure is conducted through the pipe line 37 and the coupling 38, tubular pivot element 29 and the frame side wall opening 42 into the plenum chamber 41, from whence it passes through the porous medium 26 for introduction into the powdered material. The latter, upon passing through the neck 28 of the conduit section 10, will reach and be deposited upon the porous medium 26 in its natural condition, whereupon the finely divided gas emitted from the porous medium 26 will intermix with the powdered material so that it assumes the characteristics of a fluid. Referring particularly to Figure 1, while thus fluidified, the powdered material will flow horizontally over the surface of the porous medium 26 and spill over the side wall 24 of the frame 19 as indicated by arrows. If the rate of discharge of material from the surface of the porous medium 26 is found to be too great, the feeder unit 18 may be adjusted to a suitably inclined position intermediate those shown in Figures 1 and 5. On the other hand, if the discharge rate is not sufficiently great, the feeder unit 18 may be adjusted to a suitably inclined position intermediate those shown in Figures 1 and 4. It will be appreciated that the feeder unit 18 may be inclined more or less to make the material discharge correspondingly more or less clean. In addition, it will be appreciated that if the flow of air or gas into the plenum chamber 41 is cut off, the powdered material ceases to be aerated, loses its fluid characteristics and ceases to flow, even if the feeder unit 18 and the shut off valve 43 are in opened condition.

The general principles involved in the conveyance of finely divided or pulverulent dry materials along the surface of a gas permeable, rigid, porous medium by passing gas through the latter and introducing it into the material are already well known and understood. That some inclination of the surface of the porous medium usually is desirable, depending upon the properties of the material, is likewise well known and understood. However, different materials or different forms of the same material that have different properties are not handled with the same degree of efficiency by the same known organization because these known organizations are each arranged for handling one and only one selected material with maximum efficiency. When it is attempted to handle another material that has different properties, for example, a different angle of repose, the discharge from the porous medium may not have the desired characteristics, but nothing can be done about it. The present invention obviates this serious disadvantage.

It will be understood that the present invention is susceptible of various changes and modifications which may be made from time ot time without departing from the general principles or real spirit of the invention, it is accordingly intended to claim the same broadly as well as specifically as indicated by the appended claims.

What is claimed as new and useful is:

1. In combination with a conduit through which powdered material flows by gravity, a feeder unit in the path of said material comprising a porous medium for receiving said material, and means for forcing gas through said porous medium to fluidify said material and flow the latter over the surface of said porous medium, and for positioning said porous medium with its surface at a selected inclination to control the rate of flow of said material over said surface, the sides of said unit being all but one disposed in close adjacent relation to the opposed walls of said conduit throughout the range of movement of said unit, said one side of the unit being disposed in spaced relation to the associated wall of said conduit to provide an opening through which the fluidified material passes to continue gravity flow, said unit being adapted for inclination in such a position that the unit operates to close said opening, whereupon material flow is terminated and the latter accumulates above said porous medium.

2. In combination with a conduit through which powdered material flows by gravity, a feeder unit in the path of said material comprising a porous medium for receiving said material, means for forcing gas through said porous medium to fluidify said material and flow the latter over the surface of said porous medium, and for positioning said porous medium with its surface at a selected inclination to control the rate of flow of said material over said surface, the sides of said unit being all but one disposed in close adjacent relation to the opposed walls of said conduit throughout the range of movement of said unit, said one side of the unit being disposed in spaced relation to the associated wall of said conduit to provide an opening through which the fluidified material passes to continue gravity flow, and shut off valve means in said conduit arranged for conjoint action with said feeder unit in any position of the latter for terminating material flow.

3. The combination defined in claim 1 wherein the feeder unit is mounted for pivotal movement about a horizontal axis, the conduit includes a pair of parallel vertically extending flat wall areas, and a vertically extending arcuate wall area intervening said parallel wall areas, the center of curvature of said arcuate wall area is at the pivotal axis of said unit, and said unit is operatively fitted closely between said pair of parallel flat wall areas and against said arcuate wall area.

4. The combination defined in claim 1 wherein the feeder unit includes a frame member arranged and formed to provide a plenum chamber underlying the porous medium and mounted on pivot elements journalled respectively in opposite side walls of the conduit, one of said pivot elements having a hollow interior in communication with said plenum chamber, through which hollow interior said plenum chamber is supplied with gas.

References Cited in the file of this patent
UNITED STATES PATENTS

| | | |
|---|---|---|
| 1,971,853 | Thlefeldt | Aug. 28, 1934 |
| 2,316,814 | Schemm | Apr. 20, 1943 |
| 2,517,837 | Browne | Aug. 8, 1950 |